US008387727B2

(12) United States Patent
Potter et al.

(10) Patent No.: US 8,387,727 B2
(45) Date of Patent: Mar. 5, 2013

(54) FRONT DRIVE ASSEMBLY

(75) Inventors: Brian J. Potter, Cedar Falls, IA (US);
Christopher A. Bering, Dike, IA (US);
Lee R. Rients, Parkersburg, IA (US);
Charles N. Warren, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 251 days.

(21) Appl. No.: 12/875,437

(22) Filed: Sep. 3, 2010

(65) Prior Publication Data

US 2012/0055719 A1 Mar. 8, 2012

(51) Int. Cl.
*B60K 17/28* (2006.01)
(52) U.S. Cl. .................. 180/53.7; 180/68.1; 474/148
(58) Field of Classification Search .............. 180/53.7, 180/68.1; 474/148, 150
See application file for complete search history.

(56) References Cited

U.S. PATENT DOCUMENTS

| | | | |
|---|---|---|---|
| 3,483,763 A | 12/1969 | Enters | |
| 3,828,878 A | 8/1974 | Clapsaddle, Jr. | |
| 4,074,662 A * | 2/1978 | Estes | 123/41.12 |
| 4,244,435 A * | 1/1981 | Hom | 180/292 |
| 4,763,744 A | 8/1988 | McVicar et al. | |
| 5,040,615 A | 8/1991 | Fletcher | |
| 5,094,309 A | 3/1992 | Vlaanderen et al. | |
| 5,197,423 A | 3/1993 | Ebesu et al. | |
| 5,588,325 A * | 12/1996 | Green et al. | 74/15.63 |
| 7,086,369 B2 * | 8/2006 | Stone | 123/195 R |
| 2009/0098961 A1 * | 4/2009 | Hasegawa et al. | 474/61 |
| 2009/0301429 A1 * | 12/2009 | Takashina et al. | 123/197.5 |
| 2009/0312145 A1 * | 12/2009 | Pohl et al. | 477/37 |
| 2010/0099533 A1 * | 4/2010 | Horsfall et al. | 475/146 |
| 2010/0108179 A1 * | 5/2010 | Emerson, Jr. | 141/1 |
| 2011/0226539 A1 * | 9/2011 | Huss et al. | 180/65.21 |

FOREIGN PATENT DOCUMENTS

| | | |
|---|---|---|
| DE | 3213714 | 1/1983 |
| JP | 7047861 | 2/1995 |

OTHER PUBLICATIONS

German Search Report Jun. 12, 2012 (4 pages).
English abstract for JP7047861 A.

* cited by examiner

*Primary Examiner* — Toan To
*Assistant Examiner* — James English

(57) ABSTRACT

A vehicle front drive assembly includes a housing supporting a plurality of belt driven pulleys, including an input pulley driven by an engine of the vehicle, a first driveshaft, a front PTO drive, and a second driveshaft. The first driveshaft can be connected directly between the engine and the input pulley. The front PTO drive has a housing rotatably supporting an input member, an auxiliary drive member and a PTO driveshaft, and enclosing a PTO transmission. A second driveshaft can be coupled between the engine and the auxiliary drive member. The first driveshaft is removable from the assembly when the second driveshaft and the front PTO drive are connected between the engine and the input pulley. The second driveshaft and the front PTO drive are removable from the assembly when the first driveshaft is connected between the engine and the input pulley.

9 Claims, 6 Drawing Sheets

FRONT DRIVE ASSEMBLY

FIELD OF THE INVENTION

The present invention relates to a vehicle front drive assembly.

BACKGROUND OF THE INVENTION

A vehicle, such as a tractor, with a front power-take-off (PTO) requires a drive mechanism to deliver torque or power to the PTO. Such a vehicle also requires an auxiliary (or accessory) belt drive system to provide power to belt-driven components such as an A/C compressor, alternator, an air-brake compressor and/or cooling fans. In many cases there are multiple combinations of alternator sizes & cooling fan speeds needed to support the various options on the vehicle. The multiple combinations of these options on the vehicle and the packaging space available presents a challenge to the designer to find a solutions that requires the minimum amount of space and minimum number of parts to achieve all the above goals.

SUMMARY

Accordingly, an object of this invention is to provide a vehicle front drive assembly which is adaptable and modifiable.

A further object of the invention is to provide such a front drive assembly which is compact.

These and other objects are achieved by the present invention, wherein a vehicle front drive assembly includes an auxiliary drive housing which supports a plurality of belt driven pulleys, including an input pulley driven by an engine of the vehicle. A first driveshaft has a first end for coupling to the engine and a second end for coupling directly to the input pulley. A front PTO drive has a housing rotatably supporting an input member, an auxiliary drive member and a PTO driveshaft. The housing encloses a PTO transmission for coupling the input member to the PTO driveshaft.

A second driveshaft has a first end for coupling to the engine and a second end for coupling to the auxiliary drive member. The first driveshaft is removed from the assembly when the second driveshaft and the front PTO drive are connected between the engine and the input pulley. The second driveshaft and the front PTO drive are removed from the assembly when the first driveshaft is connected between the engine and the input pulley.

The auxiliary drive housing includes a pair of lower brackets for attaching to a frame of the vehicle. These brackets are on either side of an opening which is adapted to receive an upper part of the PTO drive housing. The auxiliary drive housing also includes a bracket which projects from a central portion of the housing and which is adapted to support an alternator. The auxiliary drive housing also includes a hollow cylindrical bearing member which is positioned above the central portion. The bearing member is adapted to receive a fan driveshaft. The auxiliary drive housing also includes an upper side bracket which projects to one side of the bearing support for attaching to a component, such as an electronic control unit. The auxiliary drive housing also includes a top bracket which projects upwardly for attaching to a component, such as an implement control unit.

DESCRIPTION OF THE PREFERRED EMBODIMENT

Figure 1:
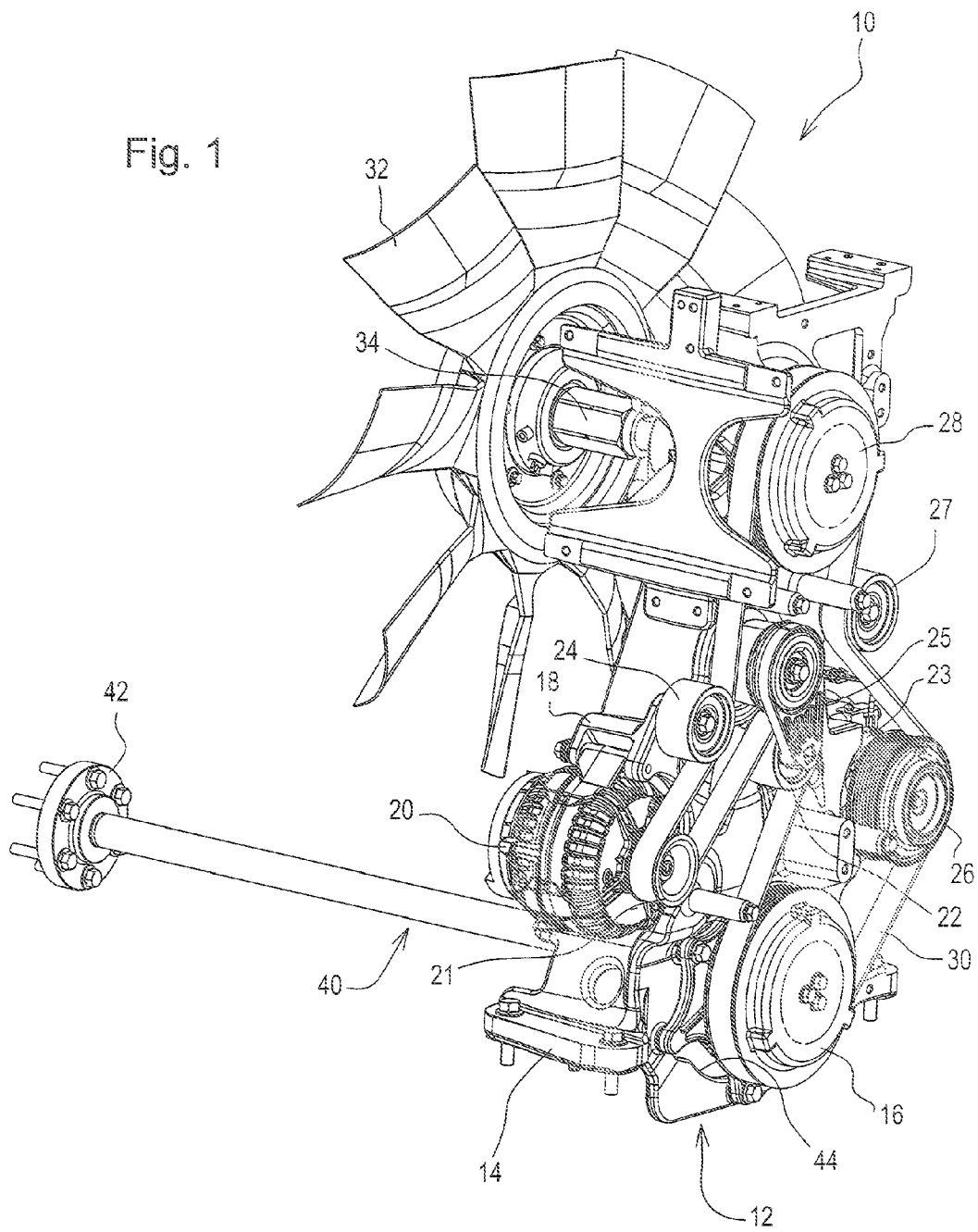
FIG. 1 is an upper front perspective view of a front drive assembly without a PTO drive.
Figure 2:
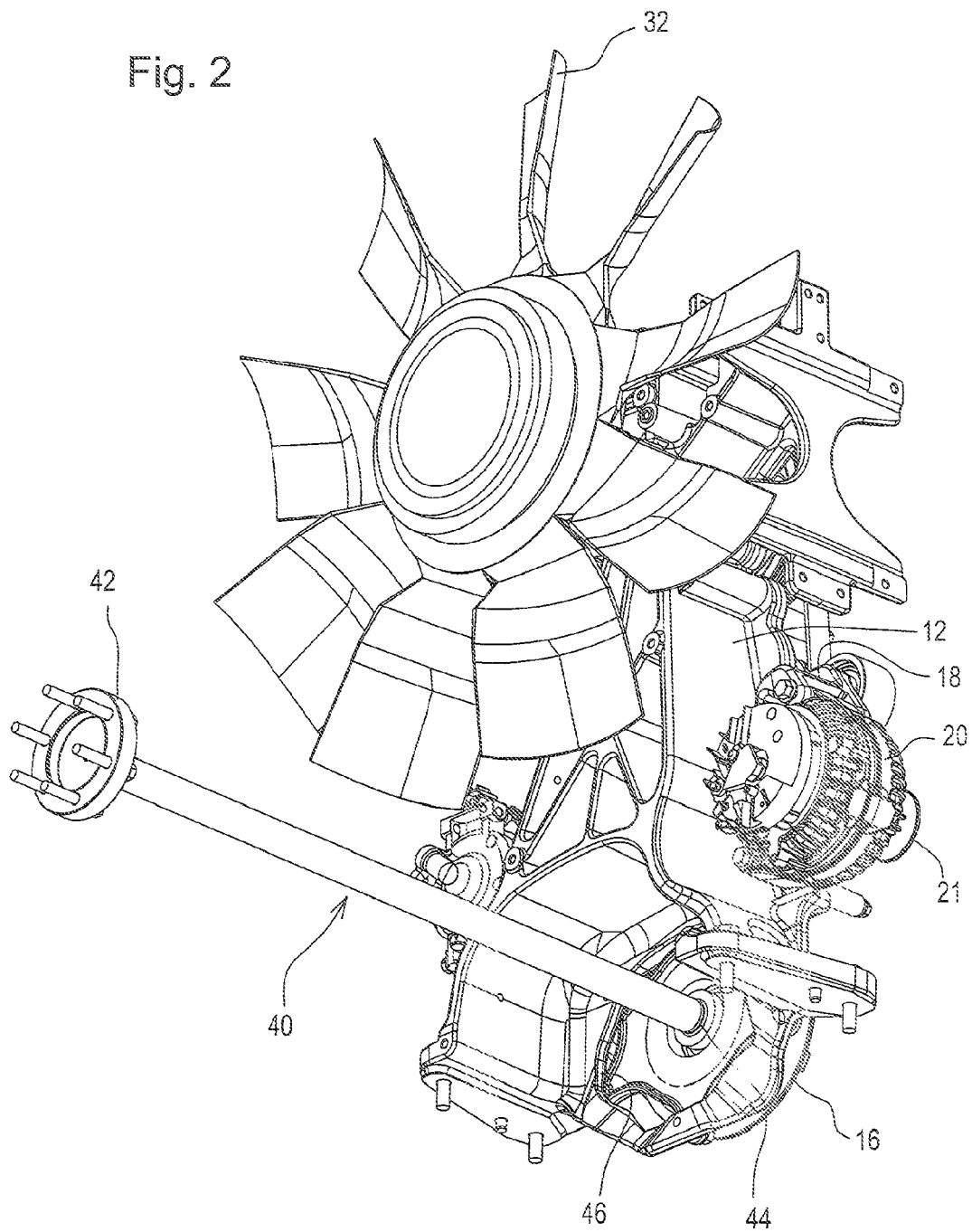
FIG. 2 is a lower rear perspective view of a front drive assembly without a PTO drive.

Referring to FIGS. 1 and 2, a vehicle front drive assembly 10 includes an auxiliary belt drive assembly or system 11 with an auxiliary drive housing 12 which includes a base 14 for mounting on a frame (not shown) of the vehicle (not shown). The housing 12 supports a belt 30 which engages and circulates around a plurality of belt driven pulleys, including an input pulley 16 which is driven by an engine (not shown) of the vehicle. The housing 12 includes a bracket 18 which supports an auxiliary unit or component 20 with a pulley 21, such as an alternator or generator, and a bracket 19 which supports auxiliary unit or component 23, such as an AC compressor with a pulley 26. The housing 12 supports a tensioning pulley 22, idler pulleys 24 and 27, and fan driveshaft 34 which is connected to fan drive pulley 28. Belt 30 is driven by input pulley 16 and circulates around the other pulleys. Fan drive pulley 28 is connected to fan 32 by the fan driveshaft 34. Tensioning pulley 22 is mounted on a pulley support 25 which is pivotally mounted on the housing 12.

A first driveshaft 40 has a first end 42 for coupling to a crankshaft (not shown) of the engine and has a second end 44 for coupling directly to the input pulley 16 and which extends through an opening 46 in the housing 12.

Figure 3:
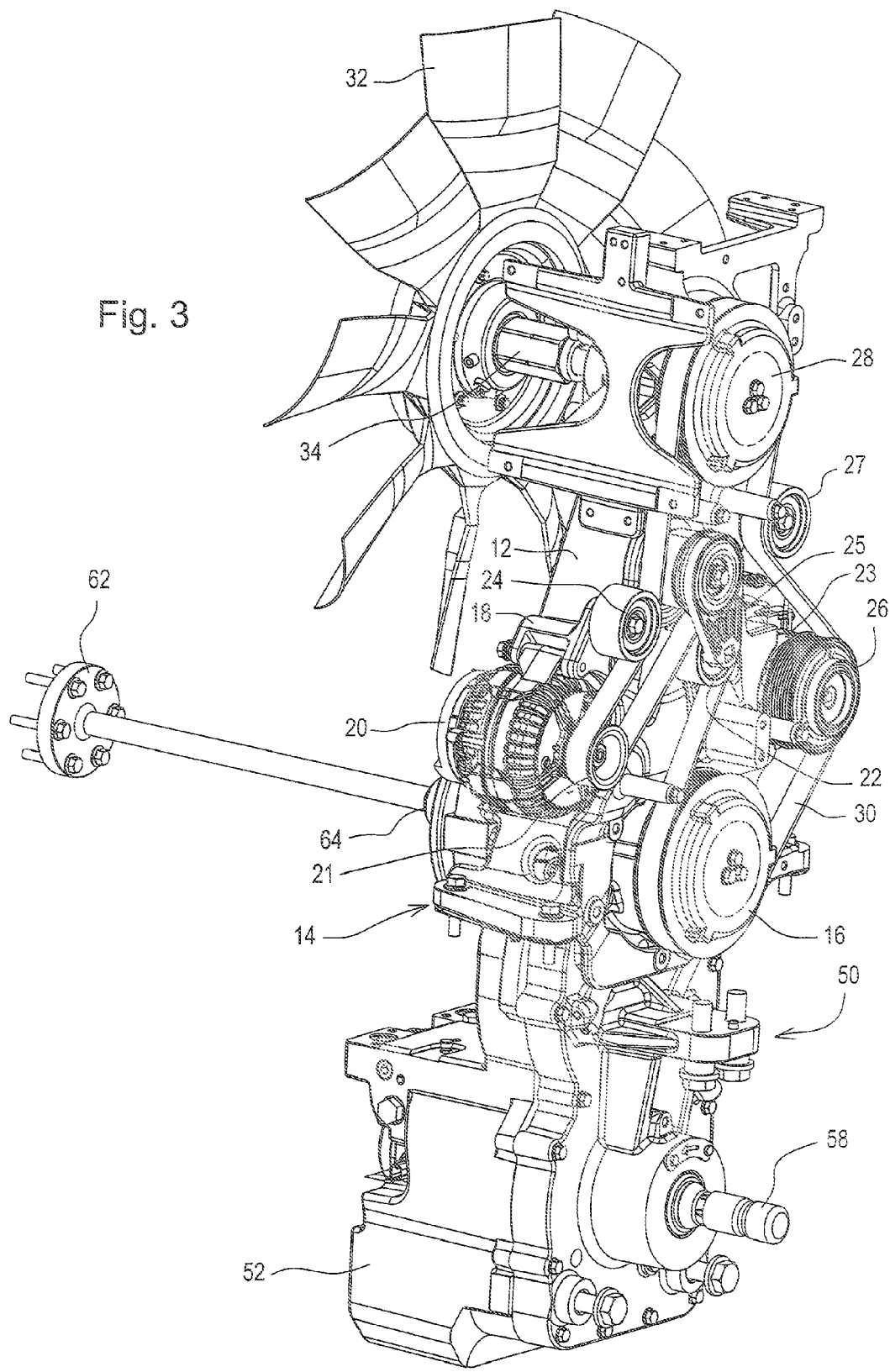
FIG. 3 is an upper front perspective view of a front drive assembly with a PTO drive.
Figure 4:
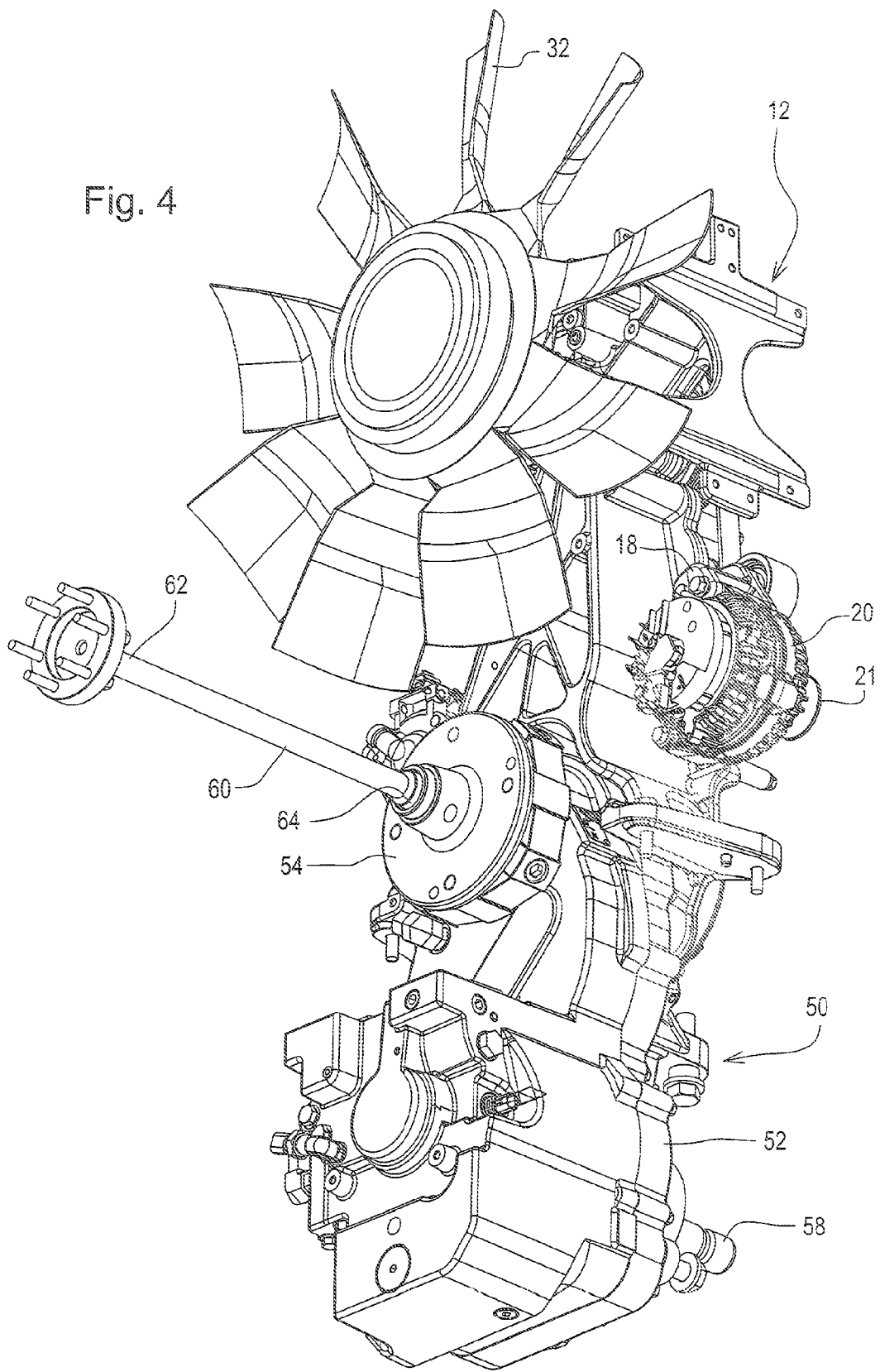
FIG. 4 is a lower rear perspective view of a front drive assembly with a PTO drive.
Figure 5:
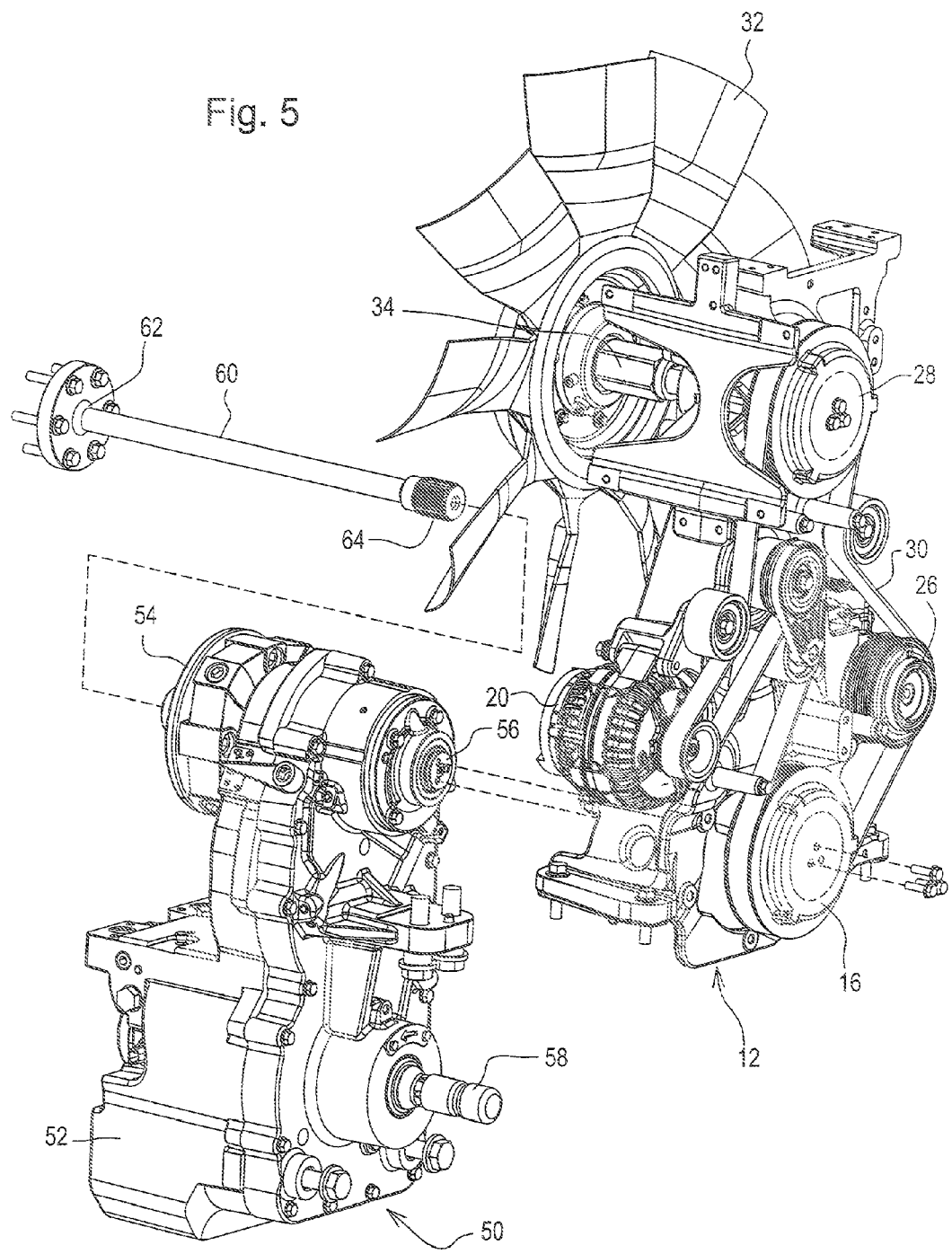
FIG. 5 is an exploded view of the front drive assembly of FIG. 3.

Referring now to FIGS. 3, 4 and 5, a front PTO drive 50 includes a housing 52 which rotatably supports an input member 54, an auxiliary drive member or top shaft 56 and a PTO driveshaft 58. The housing 52 encloses a conventional PTO transmission (not shown) for coupling the input member 54 to the PTO driveshaft 58. A second driveshaft 60 has a first end 62 for coupling to the engine crankshaft (not shown) and a second end 64 with splines (see FIG. 5) for coupling to the input member 54. Thus, the assembly 10 includes the belt drive system 11 together with first driveshaft 40, or the belt drive system 11 together with second driveshaft 60 and PTO drive 50.

Figure 6:
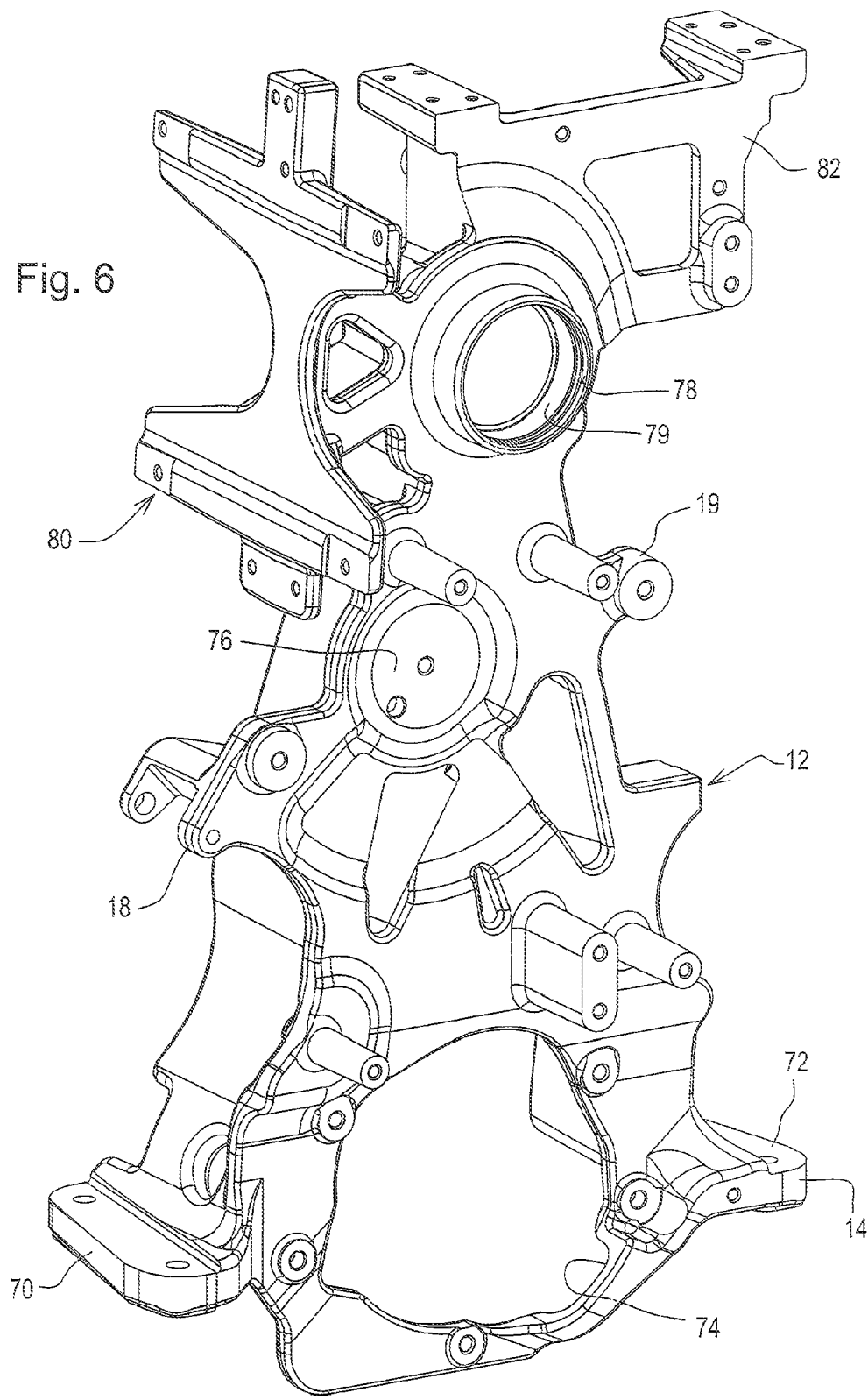
FIG. 6 is a view of the drive support housing of the front drive assembly of FIGS. 1-5.

Referring now to FIG. 6, auxiliary drive housing 12 includes the previously mentioned base 14 with lower left and right mounting brackets 70 and 72 on either side of a first lower opening 74. Opening 74 is adapted to receive a torque transmitting member which transmits torque from the engine (not shown) to the input pulley 16. The torque transmitting member can be either an upper part of the PTO drive unit 50, or alternatively, a forward portion of the first driveshaft 40. The upper part of the PTO drive unit 50 includes a through shaft (not shown) which transmits torque from driveshaft 60 and input member 54 to output member 56. Opening 74 is aligned with the input drive pulley 16. Side bracket 18 projects from a central portion 76 to which pulley support 23 is pivotally mounted (as seen in FIG. 1). The housing 12 includes a hollow cylindrical bearing member 78 which is positioned above the opening 74 and which surrounds a second upper opening 79. An upper side bracket 80 projects to one side of the bearing member 78 for attaching to a component, such as an electronic control unit (not shown). A top bracket 82 projects upwardly for attaching to a component, such as implement control unit (not shown). As best seen in FIG. 5, the second upper opening 79 receives fan drive shaft 34.

The first driveshaft 40 is not needed and is removable from the assembly 10 when the second driveshaft 60 and the front PTO drive 50 are connected between the engine (not shown) and the input pulley 16. Alternatively, the second driveshaft 60 and the front PTO drive 50 are removable from the assembly 10 when the first driveshaft 40 is connected between the engine (not shown) and the input pulley 16.

With this design the auxiliary belt drive system 11 and front PTO 50 are driven off a single shaft 60 which is attached to the crankshaft (not shown) of the engine. When the front PTO 50 is included in the system, the top shaft 56 of the PTO 50 passes through the housing 12 and out the front end providing an attachment point for the input drive pulley 16 of auxiliary belt drive system 11. The auxiliary belt drive system 11 is arranged on a single auxiliary drive support housing 12 that straddles the front PTO housing 52 and attaches to the frame (not shown) of the vehicle.

When the front PTO option is not present on the vehicle the PTO housing 52 is removed and a longer driveshaft 40 is used so that the input drive pulley 16 of auxiliary belt drive system 11 in the same position as if the front PTO 50 where in place. Thus, the same auxiliary belt drive system 11 can be utilized on all vehicles regardless of whether or not a front PTO 50 is used.

Additionally the auxiliary belt drive system 11 is designed such that the diameter of the input drive pulley 16 is constant for all applications and the cooling fan speed is varied by varying the diameter of the cooling fan pulley 28. The auxiliary belt drive system 11 is laid out such that multiple or single sets of alternators of various sizes can be installed all on the same drive support housing 12. The only difference from one system configuration to the next is the diameter of the cooling fan pulley 28, the alternator part number the length of the belt 30. Idler pulleys are added or removed from the system as needed to drive dual or single alternators.

The driveshafts 40 and 60 are attached to the engine crankshaft (not shown) via a splined hub (not shown). This hub is preferably lubed with grease to ensure adequate spline wear. The shafts 40 and 60 should be "tuned" to the torsional vibrations in the system to minimize chatter or fretting in the spline and feedback to the belt drive system. This "tuning" can be achieved by engineering selection of shaft diameter and length based on finite element analysis results. The splined hub allows for the same shaft & hub to be used for various combinations of engines lengths and component placements.

The advantages of this design are the it allows for multiple combinations of options and configuration with the minimum number of parts all while conserving space by stacking the auxiliary belt drive system on top of the front PTO system. The only appreciable part number differences from one system configuration to the next are the belt, driveshaft, & fan pulley. All other configurations are just different combinations of those part numbers, maximizing interchangeability By moving the auxiliary belt drive system to the front of the vehicle over the front PTO allows a cooling package to be moved much closer to the engine, thus helping to reduce overall length of the vehicle. The driveshaft attachment scheme allows for variation in engine size and component placement without need for additional parts. It also allows for easy service removal and installation of the driveshaft. The tuning of the shaft permits the design to work without the need for a separate rubber isolator in the drive system.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle front drive assembly, comprising:
an auxiliary drive housing supporting at least one belt driven component paving a drive pulley;
an input pulley;
a belt engaging the input pulley and the drive pulley;
a first longer driveshaft having a first end and having second end adapted for coupling directly to the input pulley;
a front PTO drive having a PTO drive housing rotatably supporting an input member, an auxiliary drive member and a PTO driveshaft, the auxillary drive member being adapted for coupling with the input pulley; and
a second shorter driveshaft having a first end and having a second end adapted for coupling to the input member, the first driveshaft being removed from the assembly when the second driveshaft and the front PTO drive are connected to the input pulley wherein the second driveshaft is coupled to the input pulley by the input member and the auxiliary drive member, and the second driveshaft and the front PTO drive being removed from the assembly when the first driveshaft is connected to the input pulley, the first end of the first driveshaft being adapted to be coupled to an engine of a vehicle when the first driveshaft is inserted into the assembly, and the first end of the second driveshaft being adapted to be coupled to the engine of the vehicle when the second driveshaft is inserted into the assembly.

2. The front drive assembly of claim 1, wherein the auxiliary drive housing comprises:
a mounting bracket adapted for attaching to a frame of the vehicle; and
an opening which is adapted to receive a portion of the PTO drive housing.

3. The front drive assembly of claim 1, wherein the auxiliary drive housing comprises:
an opening which is adapted to receive a portion of the PTO drive housing; and
a pair of mounting brackets on either side of the opening, the mounting brackets being adapted for attaching to a frame of the vehicle.

4. The front drive assembly of claim 1, wherein the auxiliary drive housing comprises:
a component bracket adapted to support an auxiliary unit, the component bracket projecting from a central portion of the auxiliary drive housing; and
a hollow cylindrical bearing member which is positioned above the central portion, the bearing member being adapted to receive a fan driveshaft.

5. The front drive assembly of claim 4, wherein the auxiliary drive hosing comprises:
a unit bracket projecting to one side of the bearing member, the unit bracket being adapted for attaching to a unit; and
a top bracket projects upwardly and adapted for attaching to a further unit.

6. The front drive assembly of claim 1, wherein the auxiliary drive housing comprises:
a pair of lower brackets on either side of an opening which is adapted to receive an upper part of the PTO drive housing;

a side bracket adapted to support an auxiliary component, the side bracket projecting from a central portion of the housing; and a hollow cylindrical bearing member which is positioned above the central portion, the bearing member being adapted to receive a fan driveshaft;

a upper side bracket projecting to one side of the bearing member and adapted for attaching to a first unit; and a top bracket projects upwardly and adapted for attaching to a further unit.

7. A drive assembly for an engine driven vehicle, the vehicle including a cooling fan and a fan belt which is attached between an input drive pulley and a fan drive pulley, said assembly comprising:

an auxiliary drive housing supporting a belt driven auxiliary component, the auxiliary drive housing having an opening;

a first longer driveshaft insertable through the opening, the first driveshaft having a first end adapted for coupling to a crankshaft of a engine and having a second end for coupling directly to the input drive pulley;

a front PTO drive having a PTO drive housing rotatably supporting an input member, an auxiliary drive member and a PTO driveshaft; and a second shorter driveshaft having a first end adapted for coupling to the crankshaft and having a second end for coupling to the auxiliary drive member, the first driveshaft being removed from the assembly when the second driveshaft and the front PTO drive are connected between the crankshaft and the input pulley wherein the second driveshaft is coupled to the input pulley by the input member and the auxiliary drive member, and the second driveshaft and the front PTO drive being removed from the assembly when the first driveshaft is connected between the crankshaft and the input pulley.

8. The drive assembly of claim 7, wherein:

the opening is aligned with the input drive pulley.

9. The drive assembly of claim 7, wherein:

a tensioning pulley is pivotally supported on the auxiliary drive housing.

* * * * *